United States Patent [19]

Hou et al.

[11] Patent Number: 5,587,242
[45] Date of Patent: Dec. 24, 1996

[54] COLORED POLYMERIC DIELECTRIC PARTICLES AND METHOD OF MANUFACTURE

[75] Inventors: Wei-Hsin Hou; Thomas B. Lloyd, both of Bethlehem, Pa.; Frederic E. Schubert, Shoreham, N.Y.

[73] Assignee: Copytele, Inc., Huntington Station, N.Y.

[21] Appl. No.: 561,249

[22] Filed: Nov. 21, 1995

Related U.S. Application Data

[62] Division of Ser. No. 241,349, May 11, 1994, Pat. No. 5,498,674, which is a division of Ser. No. 65,572, May 21, 1993, Pat. No. 5,360,689.

[51] Int. Cl.[6] ............................................. C08F 236/20
[52] U.S. Cl. ................... 428/402; 525/331.5; 526/336; 526/344; 526/296; 526/297; 526/288; 526/312; 526/319
[58] Field of Search ......................... 428/402; 526/336; 525/331.5

*Primary Examiner*—Mark Nagumo
*Attorney, Agent, or Firm*—Plevy & Associates

[57] ABSTRACT

A process for forming dielectric particles includes admixing a vinyl halide monomer and a crosslinker in a liquid dispersion medium to form a first mixture. A second mixture of an initiator and a stabilizer is prepared and added to the first mixture to form a third mixture in which the monomer polymerizes to form white crystalline polymer particles which are sonified for uniformity. The particles may be stained by exposure to a dehydrohalegenation reagent and dispersed in an electrophoretic fluid for use in an electrophoretic display.

7 Claims, 1 Drawing Sheet

COLORED POLYMERIC DIELECTRIC PARTICLES AND METHOD OF MANUFACTURE

This is a division of application Ser. No. 08/241,349, filed May 11, 1994, now U.S. Pat. No. 5,498,674, which is a division of application Ser. No. 08/065,572, filed May 21, 1993, now U.S. Pat. No. 5,360,689.

FIELD OF THE INVENTION

The present invention relates to colored dielectric particles for use in electrophoretic image displays, electrostatic printing or the like and a corresponding method of manufacturing the colored particles. More particularly, the present invention relates to halogenated-polymer dispersions of particles, wherein the halogenated-polymer particles are originally white in color, but change color to yellow, to brown or to black after being reacted with a dehydrohalogenating reagent to different extents.

BACKGROUND OF THE INVENTION

The electrophoretic effect is well known and the prior art is replete with a number of patents and articles which describe the effect. As will be recognized by a person skilled in the art, the electrophoretic effect operates on the principle that certain particles, when suspended in a medium, can be electrically charged and thereby caused to migrate through the medium to an electrode of opposite charge. Electrophoretic image displays (EPIDs) utilize the electrophoretic effect to produce desired images. In prior art EPIDs colored dielectric particles are suspended in a fluid medium that is either clear or an optically contrasting color as compared to the dielectric particles. The colored electrophoretic particles are then caused to selectively migrate to, and impinge upon, a transparent screen electrode, thereby displacing the fluid medium from the screen and creating the desired image.

As will be recognized by a person skilled in the art, the selection of the electrophoretic particles used in the EPID is very important in determining the performance of the EPID and the quality of the viewed image produced. Ideally, electrophoretic particles should have an optimum charge/mass ratio, which is dependent upon the particle size and surface charge, in order to obtain good electrostatic deposition at high velocity as well as rapid reversal of particle motion when voltages change. Additionally, it is desirable to utilize electrophoretic particles that have essentially the same density as the fluid medium in which they are suspended. By using electrophoretic particles of essentially the same density as the suspension medium, the migration of the electrophoretic particles through the medium remains independent of both the orientation of the EPID and the forces of gravity.

To effect the greatest optical contrast between electrophoretic particles and the suspension medium, it is desirable to have either light-colored particles suspended in a dark medium or black particles suspended in a backlighted clear medium. In the prior art, it has been proven difficult to produce black electrophoretic particles that are dielectric, of uniform size and have a density matching that of a common suspension medium. As a result, EPIDs, commonly use readily manufactured light colored electrophoretic particles suspended in dark media. Such EPIDs are exemplified in U.S. Pat. Nos. 4,655,897 to DiSanto et al., 4,093,534 to Carter et al., 4,298,448 to Muller et al., and 4,285,801 to Chaing. In such art, the light colored particles are commonly inorganic pigments.

Titanium dioxide has been used in EPIDs to produce a good optical contrast between the white particles and the colored suspension medium, however, it has a density about 4 $g/m^3$ which is too high to match with any organic liquid to prevent the sedimentation problem. In the past decade, great effort has been made to solve the density problem of titanium dioxide. However, very little work has succeeded without trading off the quality of the images, especially in regard to the whiteness. Coating titanium dioxide particles with a polymeric material to reduce the density of titanium dioxide is an example.

The development of suitable dielectric black particles has remained a long felt need in the art of electrophoretic image displays. In am other than EPIDs, black particles are commonly produced from carbon black. However, carbon blacks are not readily adaptable to EPIDs because carbon blacks are conductive and the density of carbon black is not readily matched to a suitable suspension medium. Research efforts have been made in an attempt to solve the density and conductivity problems of carbon blacks, however, none has succeeded without trading off the blackness of the particles created. Such efforts to produce dielectric particles from carbon blacks are exemplified in the following articles: Fowkes et al. "Electrophoretic Display Medium", a research project report for the Department of Chemistry of Lehigh University (Aug. 28, 1989) and Hou et al. "Polymer-Encapsulated Particles With Controlled Morphologies", Ph.D. Dissertion (LeHigh University, 1991).

It is therefore an object of the present invention to produce light and dark dielectric particles suitable for use in EPIDs. It is a further object to produce colored dielectric particles which may be used in EPIDs.

SUMMARY OF THE INVENTION

The problems and disadvantages associated with conventional dielectric particles and methods for making same are overcome by the preset invention which includes a process for forming dielectric particles in which vinyl halide or vinyl monomers are polymerized in a dispersion medium to form crystalline polymer particles. The particles may be employed in an electrophoretic fluid for use in an electrophoretic display by dispersing the dielectric particles prepared by the polymerization process in a dielectric fluid.

DETAILED DESCRIPTION OF THE INVENTION

Although particles in accordance with the present invention can be used in many different applications where particles of high blackness or whiteness and low density are desired, such as paint, ink and electrostatic toner, it is especially suitable for use in connection with electrophoretic image displays (EPID). Accordingly, the dielectric particles of the present invention will be described in connection with typical EPIDs.

The present invention does not use carbon black as the source of the electrophoretic particles, rather, crystalline halogenated-polymer particles variously dehydrohalogenated are used to form dielectric black (or yellow or brown) particles suitable for use in an EPID. More particularly, the preferred embodiment of the present invention uses a dispersion polymerization technique to produce crystalline halogenated-polymer particles, although other techniques could be used, such as emulsion polymerization. The particles are further reacted with a reagent to form dielectric black particles with good blackness which produce excellent image contrast in a backlighted clear medium. Further, the particles are of low density which make them easy to match with many organic liquids and have surface functionalities which enable one to control particle charging in dielectric media to produce an optimum electrophoretic mobility.

Figure 1:
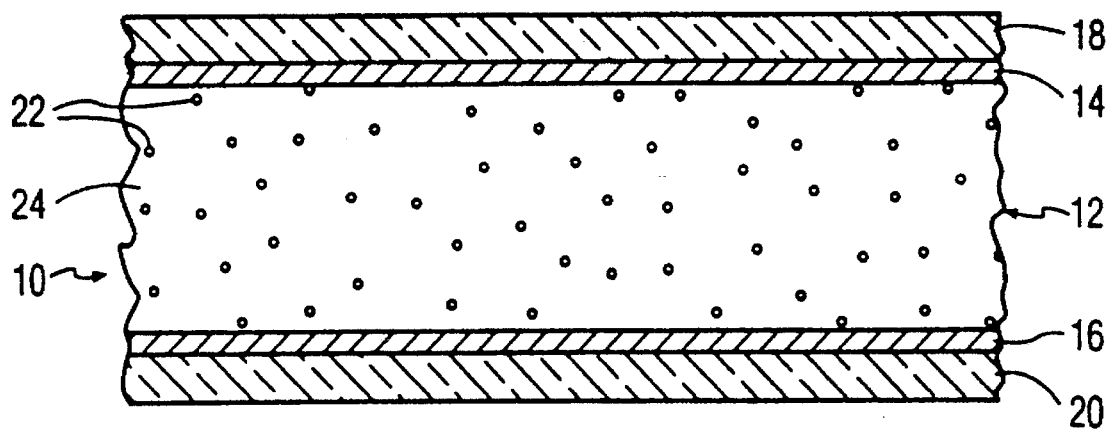
FIG. 1 is a diagrammatic, cross-sectional view of an EPID having particles in accordance with a first embodiment of the present invention.

Referring to FIG. 1, there is shown a cross-sectional view of a segment of a simple electrophoretic image display 10, magnified to show a single pixel (intersection). As will be recognized by a person skilled in the art, an EPID may contain a volume of an electrophoretic dispersion 12 disposed between an anode 14 and a cathode 16. The anode 14 and cathode 16 are deposited upon glass plates 18, 20 in the form of a thin layer of indium-tin-oxide (ITO) or a like compound. The ITO layer is deposited in such a manner as to be substantially transparent when viewed through the glass plates 16, 18.

In accordance with a first embodiment of the present invention, the electrophoretic dispersion 12 is comprised of light-colored dielectric electrophoretic particles 22 suspended in a dark colored medium 24. The electrophoretic particles 22 have a density substantially equivalent to that of the fluid medium 24 so as to remain randomly disperse in the fluid medium 24, unaffected by the orientation of the EPID or the effects of gravity. When a sufficient electrical bias is applied between the anode 14 and cathode 16, the electrophoretic particles 22 migrate in response thereto to either the cathode 16 or anode 14 depending on polarity and displace the dark color medium 24 adjacent to the ITO layer, thereby creating a white pixel. Reversing the voltage produces a dark pixel.

Figure 2:
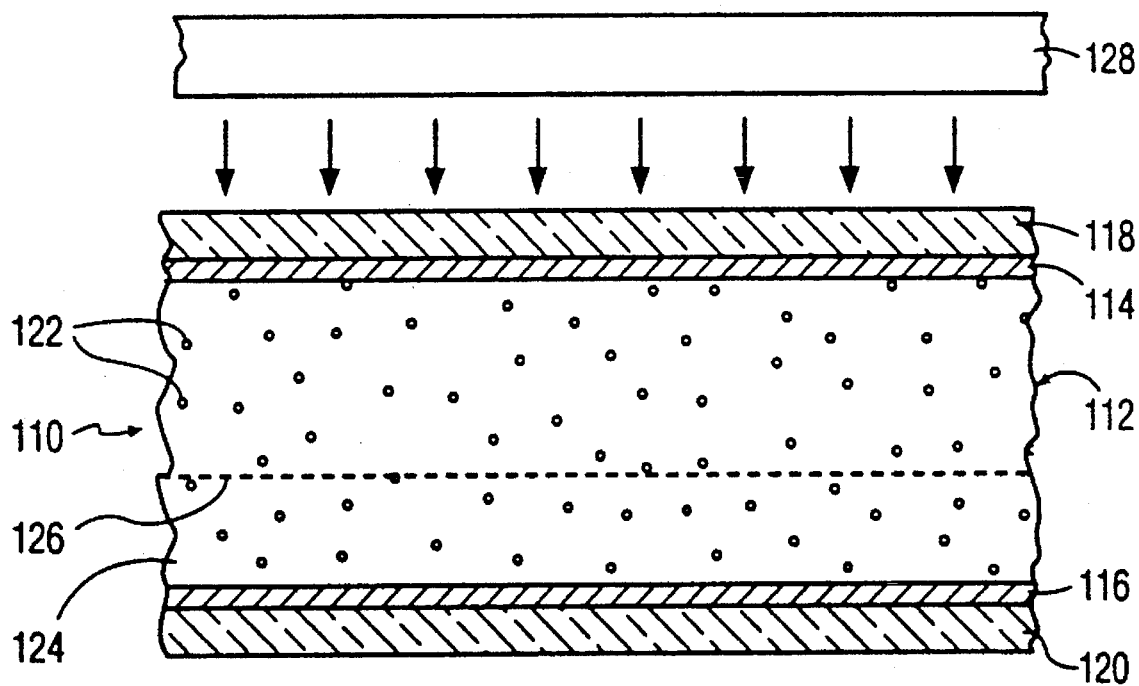
FIG. 2 is a diagrammatic cross-sectional view of an alternative EPID construction having particles in accordance with a second embodiment of the present invention.

FIG. 2 shows in cross-section a pixel of another type of EPID 110 wherein electrophoretic dielectric particles are employed in the manner of a shutter. As will be recognized by a person skilled in the art, an EPID of this type contains a volume of an electrophoretic dispersion 112 disposed between an anode 114 and a cathode 116 as in FIG. 1. A conductive mesh 126 is disposed in the fluid 112 between the cathode 116 and anode 114.

In accordance with a second embodiment of the present invention, the electrophoretic dispersion 112 is comprised of black dielectric electrophoretic particles 122 suspended in clear medium 124. The electrophoretic particles 122 have a density substantially equivalent to that of the fluid medium 124 so as to remain randomly disperse in the fluid medium 124, unaffected by the orientation of the EPID or the effects of gravity. When the cathode 116, anode 114 and the mesh 126 are properly biased, the electrophoretic particles 122 may be made to migrate to cathode 116 displacing the clear medium 124 adjacent to the ITO layer, thereby blocking the light produced by the light source 128. Alternatively, the electrodes may be biased so that the particles 122 cling to the mesh and do not block light from source 128. The displayed pixel is therefore black or white depending on the voltage settings.

As noted previously, the production of light-colored image on a dark color background or a black image on a light background is highly desirable. However, a major obstacle to such a combination has been the lack of dielectric black and white particles that have good hiding power and also a density that can be readily matched with common suspension fluids. The present invention light-colored electrophoretic particles 22 and black electrophoretic particles 122 are formed from crystalline polymer particles using a dispersion polymerization technique without and with being treated with a dehydrohalogenation reagent respectively. In general, the polymeric materials are dielectric and have low densities, therefore the final electrophoretic particles are non-conductive and can be easily matched with many suspension fluids without any sedimentation problem, and are readily used in EPIDs. Since the electrophoretic particles have a crystalline structure and have excellent heat and solvent resistance, they can be used in a wide range of organic liquids and at high temperatures during cell manufacture.

Dielectric crystalline halogenated polymer electrophoretic particles 22 and 122, may be prepared by a dispersion polymerization technique. A polymerization recipe is listed in Table 1.

TABLE I

| Materials | Weight (g) |
| --- | --- |
| Ethanol | 17.1 |
| Vinylidene Chloride | 2.0 |
| divinylbenzene | 0.1 |
| 2,2'-azobisisobutyronitrile | 0.2 |
| poly(vinyl pyrrolidone) | 0.6 |

Prior to use, the inhibitors of the monomer vinylidene chloride and of the crosslinker divinylbenzene are removed by washing with 10% NaOH aqueous solution several times, drying with calcium carbonate over night at 0° C. and then passing through a column containing an appropriate inhibitor remover. The inhibitor-free monomers and crosslinker are stored in a refrigerator for later use. In this, and subsequent processes, the vinylidene chloride and the divinylbenzene are of the type commercially produced by Aldrich Chemical Co.

The 2,2-azobisisobutyronitrile (AIBN) and poly(vinylpyrrolidone) (PVP) used as an initiator and stabilizer are manufactured by Kodak and GAF Co. respectively.

The vinylidene chloride and divinylbenzene are mixed with ethanol and charged to a closed container containing the AIBN and PVP which are carefully weighed. The closed container is purged with nitrogen by bubbling it through the solution for a certain time. The container is then warmed and agitated for a desired reaction time. In one preferred embodiment, the mixture is tumbled at thirty revolutions per minute for twenty hours at sixty degrees celsius. The final product made by the dispersion polymerization process is crystalline poly(vinylidene chloride) particles. Since the poly(vinylidene chloride) crystallized during the course of polymerization, the final particles do not have a spherical shape but, instead, form an irregular shape. The sizes of the final particles are in the range from 0.5 to 5 μm and are uniform, especially after a sonification treatment. The final particles are dielectric and have great whiteness.

To produce colored particles, the crystalline poly(vinylidene chloride) dispersion is mixed with an alcoholic solution containing a dehydrohalogenation reagent, such as sodium hydroxide, potassium hydroxide, ethoxide or methoxide, to eliminate an adjacent hydrogen atom and chlorine atom from the vinylidene chloride repeat unit. The elimination reaction can also be carried out by other dehydrohalogenation reagents such as stronger bases (NaOEt, NaNH$_2$) or weaker bases (e.g., amines). The dehydrohalogenation reaction is carried out at a desired concentration, time and temperature. In one preferred embodiment for making black electrophoretic particles 122, the dehydrohalogenation is carried out in a sodium hydroxide/ethanol solution in which the sodium hydroxide concentration is three times more than the vinylidene chloride. The reaction is conducted at ambient temperature for thirty minutes. Different degrees of dehyrohalogenation produce different colon for the final particles. In general, higher degrees of reaction (produced by longer reaction times, higher reaction temperatures or stronger bases) produce darker colored particles.

By varying the polymerization recipe of Table I and by varying other reaction parameters of the method of manufacture, the physical characteristics of the colored dielectric particles produced can be selectively altered as needed for a given application.

The use of a dispersion stabilizer in the preparation of crosslinked polymer particles is essential for preventing particle coagulation during polymerization. Various synthetic high molecular weight compounds including homopolymers, copolymers, graft polymers, block copolymers, and the like, can be used as a dispersion stabilizer. In addition to poly(vinyl pyrrolidone), other suitable dispersion stabilizers are poly(vinyl methyl ether), polyethyleneimine, vinyl acetate copolymer, ethyl cellulose, hydroxypropyl cellulose, and the like.

The monomer, vinylidene chloride, can be substituted with different vinyl halide monomers such as vinyl chloride, vinyl fluoride, vinyl bromide, vinylidene fluoride, vinylidene chloride, vinylidene bromide, and the like. In addition, other vinyl monomers having the structure

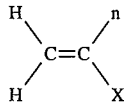

where X is halide, hydroxyl, carboxyl, ethoxyl, trialkylammonio, acrylonitrillic, acetate, diazoniodialkylsulfonio, cyano, dihydroxyl, oxyl imino, nitro, dihalo, and the like can also be used in this invention to produce conjugated structures through elimination reactions to produce different colored particles and n is selected as either H or X.

The crosslinker, divinylbenzene, can also be substituted by other compounds having two or more polymerizable double bonds such as nonconjugated divinyl compounds, diacrylate compounds, triacrylate compounds, dimethacrylate compounds, trimethacrylate compounds, and the like.

Other preferred radical polymerization initiators which can be used in the dispersion polymerization are 4,4'-azobis(4-cyanopentanoic acid), 2,2'-azobis(2-methylbutyrontrile), benzoyl peroxide, lauroyl peroxide, octanoyl peroxide, and the like.

The dispersion medium, methanol can be substituted with other alcohols, benzyl alcohol, an the like, or with hydrocarbons such as hexane, octane, decane, cylcohexane, xylene, and the like, or with ethers, halogenated hydrocarbons, ketones, esters and the like.

After the polymerization process, the white or light color particles are transferred from the dispersion medium to a desired dielectric medium by a washing process which involves mixing the final product with a solvent which is soluble in both the dispersion medium and the desired dielectric medium, centrifuging the mixture to separate the particles and the liquids and decanting the supernatant to receive the concentrated particles. The washing procedure is repeated several times until the methanol is completely removed. The solvent washed particles are then redispersed in the desired dielectric medium with the addition of a charge control agent and a dark colored dye. Sometimes, a stabilizer or a co-stabilizer is added to the final dispersion to help prevent the particles from coagulating. The final dispersion contains electrophoretic particles having a certain electrophoretic mobility dispersed in a dark color-dyed fluid which gives optical contrast with the white particles, and is ready to be used in EPIDs.

The highly dehydrohalogenated black particles are transferred from water to a desired dielectric medium by the same washing process. After being transferred to the desired medium, a charge control agent, sometimes together with a stabilizer or a co-stabilizer, is added to the dispersion to produce a final black dispersion containing charged black particles suspended in a clear medium, which is ready to use in EPIDs.

The preferred dielectric media for the final dispersion are non-polar solvents such as tetrachloroethylene, carbon tetrachloride, pentane, octane, decane, cyclohexane, benzene, xylene, Isopars, (coparaffinates comprising mixtures of water-insoluble isoparaffinic acids partially neutralized with hydroxybenzyldialiphatic amines) and the like, or a mixture of liquids. The solvents used for washing the particles should be soluble in both the dispersion medium and the dielectric medium. Examples are ethanol, propanol, butanol, acetone, tetrahydrofuran, ketones, ethers, esters and the like.

The desirable charge control agents for positive charging are surfactants with a acidic character such as polyisobutylene succinic anhydride, cupric naphthenate, zirconium octoate, zinc octoate, calcium octoate, polyvinyl alcohol, polyacrylic acid, polymethacrylic acid, polyvinyl chloride, and the like. The desirable charge control agents for negative charging are surfactants with a basic character such as polyisobutylene succinimide, barium petronate, barium sulfonate, barium dinonylnaphthalenesulfonate, polyvinyl pyridine, pyridine, lecithin, polyvinyl acetate, polyethylene oxide, polymethyl methacrylate, polyacrylamide, polyesters, polyesters, and the like.

The dye is preferred to have a dark color such as Solvent Blue, Oil Blue A, Sudan Black B, Sudan Red 7B, and the like. The preferable stabilizers or co-stabilizers used with the charge control agents are high molecular weight compounds including homopolymers, copolymers, graft polymers, block copolymers, natural high molecular weight compounds, and the like. Specific examples of suitable stabilizers are poly(12-hydroxystearic acid)-graft-poly(methyl methacrylate-methacrylic acid), polystyrene-co-poly(vinyl pyridine), poly(vinyl alcohol)-co-polyethylene, polyisobutylen-co-polyacrylic acid, polyisobutylene-co-polyamide, and the like.

As will be recognized by a person skilled in the art, the halogenated-polymer particles made by emulsion polymerization, miniemulsion polymerization, microemulsion polymerization, suspension polymerization, precipitation, seeded emulsion polymerization or seeded dispersion polymerization, can also be used as white electrophoretic particles, or be used as colored electrophoretic particles after being treated with a dehydrohalogenation reagent.

All equivalents, variations and modifications that can be applied to the described present invention by a person skilled in the art, are intended to be included within the scope of this invention as defined by the appended claims.

I claim:

1. A plurality of dielectric particles for use in an electrophoretic fluid, said particles being formed by a process comprising the steps of:

polymerizing a monomer selected from the group consisting of vinyl halide monomers and vinyl monomers having the formula

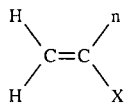

where X is selected from the group consisting of a halide, carboxyl, ether trialkylammonio, acetate, diazoniodialkylsulfonio, cyano, and oxyl imino using dispersion polymerization to form irregularly-shaped crystalline polymer particles, and where n is selected as H or X; wherein said step of polymerization includes:

(a) admixing said monomer and a crosslinker in a dispersion medium to form a first mixture;

(b) preparing a second mixture of an initiator and a dispersion stabilizer for retarding the coagulation of said particles during said polymerization;

(c) adding said first mixture to said second mixture to form a third mixture and allowing said monomer to polymerize to form said irregularly shaped crystalline polymer particles; and (d) sonifying said third mixture after polymerization to make said irregularly-shaped crystalline polymer particles uniform in size.

2. The dielectric particles of claim 1, wherein said crosslinker is selected from the group consisting of divinylbenzene, nonconjugated divinyl compounds, diacrylate compounds, triacrylate compounds, dimethacrylate compounds, and trimethacrylate compounds.

3. The dielectric particles of claim 1, wherein said initiator is selected from the group consisting of 2,2-azobisisobutyronitrile, 4-4'-azobis(4-cyanopentanoic acid), 2,2'-azobis(2-methylbutyronitrile), benzoyl peroxide, lauroyl peroxide and octanoyl peroxide.

4. The dielectric particles of claim 1, wherein said stabilizer is selected from the group consisting of poly(vinyl pyrrolidone), poly(vinyl methyl ether), polyethyleneimine, vinyl acetate copolymer, ethyl cellulose and hydroxypropyl cellulose.

5. The dielectric particles of claim 1, wherein said dispersion medium is selected from the group consisting of ethanol, methanol, benzyl alcohol, hexane, octane, decane, cyclohexane, xylene, ethers, halogenated hydrocarbons, ketones and esters.

6. The dielectric particles of claim 1, wherein said size of said particles in step (d) is in the range from 0.5 to 5.0 micrometers.

7. The dielectric particles of claim 1, wherein said process further includes the step of coloring said polymer particles by exposing said particles of step (c) to a dehydrohalogenation reagent.

* * * * *